United States Patent
Wang et al.

(10) Patent No.: US 7,092,081 B2
(45) Date of Patent: Aug. 15, 2006

(54) APPARATUS FOR MEASURING OPTOELECTRIC PROPERTIES OF OLED AND THE MEASUREMENT METHOD THEREOF

(75) Inventors: Yen-Lin Wang, Miaoli Hsien (TW); Ju-Chung Chen, Taipei Hsien (TW); Shu-Shin Lin, Yunlin Hsien (TW)

(73) Assignee: RiTdisplay Corporation, Hsinchu (TW)

(*) Notice: Subject to any disclaimer, the term of this patent is extended or adjusted under 35 U.S.C. 154(b) by 176 days.

(21) Appl. No.: 10/707,648

(22) Filed: Dec. 30, 2003

(65) Prior Publication Data

US 2005/0146713 A1    Jul. 7, 2005

(51) Int. Cl.
*G01J 1/42* (2006.01)

(52) U.S. Cl. ..................................... 356/218

(58) Field of Classification Search ............. 356/138, 356/139, 614–619, 394, 601
See application file for complete search history.

(56) References Cited

U.S. PATENT DOCUMENTS 5,712,706 A * 1/1998 Castore et al. .............. 356/394

* cited by examiner

*Primary Examiner*—Tu T. Nguyen
(74) *Attorney, Agent, or Firm*—Jiang Chyun IP Office

(57) ABSTRACT

An apparatus for measuring the optoelectric properties of an organic light-emitting device (OLED) comprising a platform, a goniometer, a three-axis moving device and a computer. The goniometer is disposed on one side of the platform and an OLED is disposed on the goniometer. The three-axis moving device is disposed on another side of the platform. The photo-detector is disposed on the three-axis moving device with the photo-detector toward the OLED on the goniometer. The goniometer, the three-axis moving device and the photo-detector are connected to the computer.

14 Claims, 2 Drawing Sheets

APPARATUS FOR MEASURING OPTOELECTRIC PROPERTIES OF OLED AND THE MEASUREMENT METHOD THEREOF

BACKGROUND OF INVENTION

1. Field of the Invention

The present invention relates to an apparatus for measuring optoelectric properties and measurement method thereof. More particularly, the present invention relates to an apparatus for measuring optoelectric properties of an organic light-emitting device (OLED) and the measurement method thereof.

2. Description of the Related Art

Organic light-emitting device (OLED) is a flat panel display device with a high electrical-to-photonic energy conversion efficiency. OLED display panels are frequently used in mobile phones, personal digital assistants (PDAs) and various other types of flat display devices. Because of the many special properties useful in this multi-media age including no viewing angle restriction, easy to fabricate, low production cost, high response speed, wide operating temperature range and full colorization, research and development on OLEDs are intense and focused. The organic light-emitting panel is a device that utilizes the organic functional materials, which radiate spontaneously to achieve image display. According to the molecular weight of the organic functional materials, the organic light-emitting panel is classified into two types, i.e. the small molecule OLED (SM-OLED) and the polymer light-emitting device (PLED).

In general, optoelectric properties of OLED must be tested as soon as the fabrication is finished. In other words, the brightness, the coloration, the viewing angle, the degree of display uniformity, the contrast and the response time must be measured accurately. Conventionally, the optoelectric properties of an OLED are measured according to the following method.

First, an organic light-emitting device (OLED) is clamped on a simple fixture. Thereafter, power is provided to the OLED through a power supply such as a Topmard 6306D direct current power supply. A photo-detector (SR-2) is positioned manually before a brightness measurement of the OLED is carried out. The resulting measurement is recorded manually and then fed into a computer for data rearrangement, graph plotting or statistical data analysis. A viewing angle measurement of the OLED is then carried out manually by turning the fixture holding the OLED a fixed rotation angle (for example, a rotation of 10°). Subsequently, the aforementioned photo-detector is again used to measure the brightness. A measurement is carried out for each 10° rotation. Furthermore, uniformity of the OLED is also carried out manually by moving the fixture holding the OLED to a new position and then using naked-eye inspection and the aforementioned photo-detector to measure the brightness. To measure the contrast of the OLED, a brightness meter (Lux meter) is used to measure overall brightness level of the surrounding. Thereafter, the brightness meter is used to find the contrast ratio of the OLED. After the measurement of various optoelectric properties, all the data have to be fed into a computer manually so that the data can be processed, plotted out in graphic form or statistically analyzed. Furthermore, the aforementioned measurements may have to be repeated a number of times during which the operator cannot leave if an accurate and useful analysis is required.

Hence, in the conventional method of measuring the optoelectric properties of an OLED, a lot of time and labor is spent during the measurement to adjust the angles, position the device, clamp the device, align the instrument, dissemble the device and calibrate the instruments. Each OLED has to go through the same set of operations manually. Furthermore, visual alignment is very imprecise and the manual adjustment, setting, positioning and turning of the OLED and the measuring instrument may produce so much errors that the measured results are highly inaccurate. Lastly, the conventional method does not provide any means of gauging the response time of the OLED.

SUMMARY OF INVENTION

Accordingly, the present invention is to provide an apparatus and a method for measuring optoelectric properties of an OLED so that the measured results are more accurate.

The invention is also to provide an apparatus and a method for measuring optoelectric properties of an OLED so that the amount of time and labor spent in the measurement is reduced.

The invention is further to provide an apparatus and a method for measuring optoelectric properties of an OLED that can also measure the response time.

To achieve these and other advantages and in accordance with the invention, as embodied and broadly described herein, the invention provides an apparatus and a method for measuring optoelectric properties of an organic light-emitting device (OLED). The apparatus comprises a platform, a goniometer, a three-axis moving device, a photo-detector and a computer. The goniometer is disposed on one side of the platform and an OLED is attached to the goniometer. The goniometer is capable of rotating and/or tilting so that the OLED can be oriented to any specified angle and inclination on command. The three-axis moving device is disposed on another side of the platform and the photo-detector is disposed on the three-axis moving device such that the photo-detector toward the OLED on the goniometer. The three-axis moving device can be instructed to move forward or backward, up or down and left or right so that the photo-detector is brought to a position demanded. Therefore, by setting of the five axial movements in the three-axis moving device and the goniometer, various optoelectric properties of the OLED can be accurately measured. In addition, the computer, the goniometer, the three-axis moving device and the photo-detector are linked together for controlling the rotation angle and the tilt angle of the goniometer and the location of the three-axis moving device. Furthermore, the data measured by the photo-detector are automatically fed into the computer. Inside the computer, some other operations on the data may be performed such as data processing, graph plotting or statistical sorting. The apparatus may also comprise an integrated sphere disposed on the three-axis moving device for providing a uniform brightness level in the surrounding. Hence, the photo-detector is able to measure the contrast ratio of the OLED and provide contrast measurement results. The apparatus may also include a power supply and a current driver. The power supply provides electric power to the OLED under the control of the computer. The current driver is linked to the power supply and the OLED so that the computer may drive the OLED to perform an OLED response time measurement under predetermined conditions.

This invention also provides an apparatus for measuring optoelectric properties of an organic light-emitting device (OLED). The apparatus comprises a platform, a goniometer, a three-axis moving device, a brightness detector and a computer. The goniometer is disposed on one side of the platform and an OLED is attached to the goniometer. The goniometer is capable of rotating and/or tilting so that the OLED can be oriented to any specified angle and inclination on command. The three-axis moving device is disposed on another side of the platform and the brightness detector is disposed on the three-axis moving device such that the brightness detector towards the OLED on the goniometer. The three-axis moving device can be instructed to move forward or backward, up or down and left or right so that the brightness detector is brought to a position demanded. Therefore, by setting of the five axial movements in the three-axis moving device and the goniometer, various optoelectric properties of the OLED can be accurately measured. In addition, the computer, the goniometer, the three-axis moving device and the brightness detector are linked together for controlling the rotation angle and the tilt angle of the goniometer and the location of the three-axis moving device. Furthermore, the data measured by the brightness detector are automatically fed into the computer. Inside the computer, some other operations on the data may be performed such as data processing, graph plotting or statistical sorting. The apparatus may also comprise an integrated sphere disposed on the three-axis moving device for providing a uniform brightness level in the surrounding. Hence, the brightness detector is able to measure the contrast ratio of the OLED and provide contrast measurement results. The apparatus may also include a power supply and a current driver. The power supply provides electric power to the OLED under the control of the computer. The current driver is linked to the power supply and the OLED so that the computer may drive the OLED to perform an OLED response time measurement under predetermined conditions.

This invention also provides a method of using the aforementioned apparatus to measure the optoelectric properties of an OLED. First, the computer instructs the power supply to provide necessary power for driving the OLED. Thereafter, the computer instructs the three-axis moving device to move to a designated location and the goniometer to rotate and/or tilt to a specified angle. The photo-detector disposed on the three-axis moving device is activated to measure various optoelectric properties. The integrated sphere is activated to provide a uniform brightness level in the surrounding. The photo-detector is again used to measure the contrast ratio of the OLED. Furthermore, the computer also drives the OLED via the current driver so that an OLED response time measurement can be performed under a specified set of conditions. All the results measured by the photo-detector are automatically sent to the computer and recorded. Inside the computer, the results are data-processed, plotted or statistically analyzed.

Because all optoelectric property measurements of the OLED are carried out under full computer control, the measurement is fast and the measured results are highly trustworthy. Moreover, the apparatus requires only one alignment operation for OLED and all subsequent optoelectric properties measurements are automatic. Hence, considerable manpower is saved.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
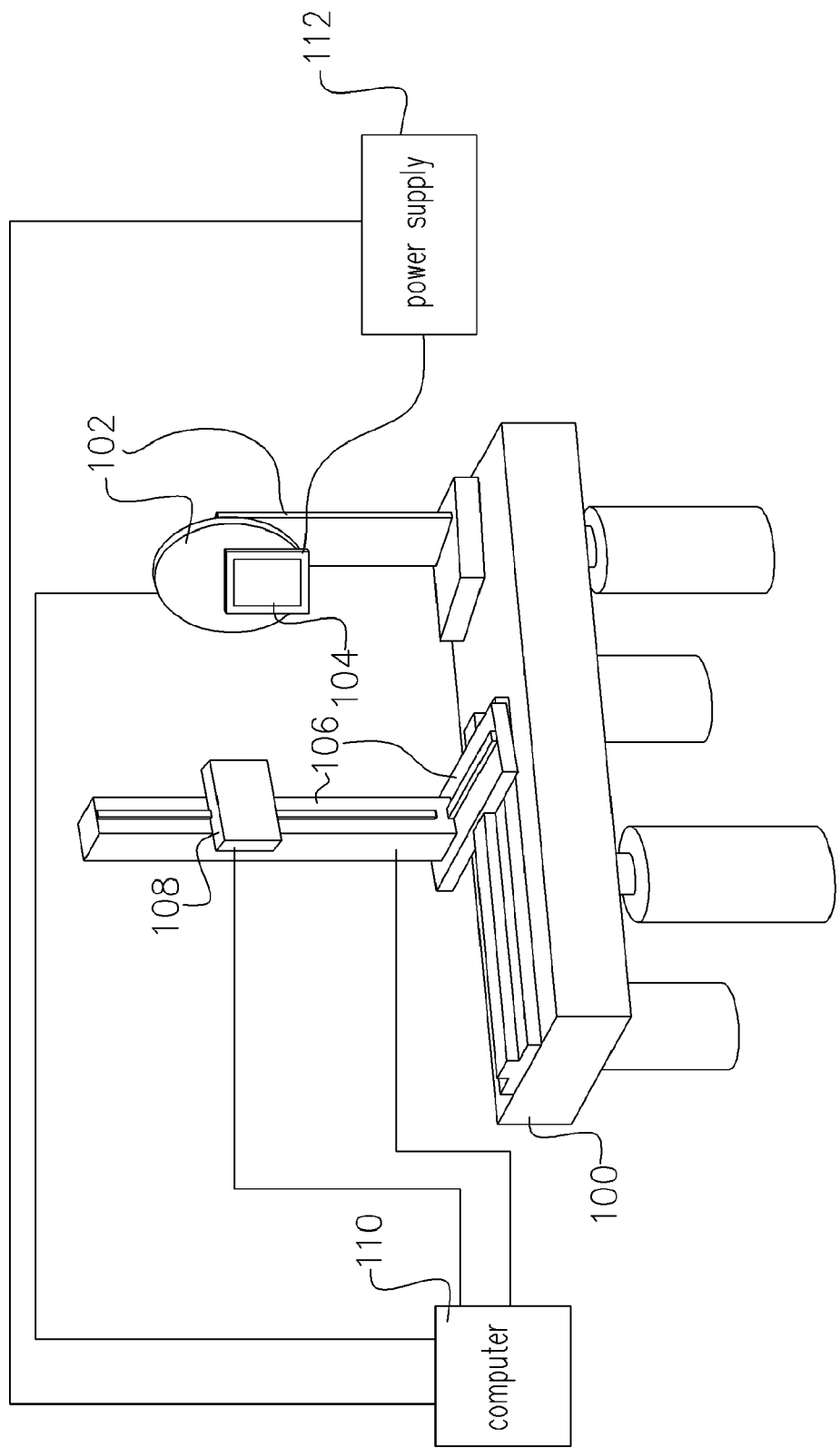
FIG. 1 is a sketch showing an apparatus for measuring the optoelectric properties of an OLED according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a sketch showing an apparatus for measuring the optoelectric properties of an OLED according to one preferred embodiment of this invention. As shown in FIG. 1, the apparatus for measuring the optoelectric properties of an OLED comprises a platform 100, a goniometer 102, a three-axis moving device 106, a photo-detector 108 and a computer 110.

The goniometer 102 is disposed on one side of the platform 100 and an OLED 104 is attached to the goniometer 102. The goniometer 102 is capable of rotating and/or tilting so that the OLED 104 can be oriented to any specified angle and inclination on command. The OLED 104 is connected to a power supply 112. The power supply 112 provides power to the OLED 104 so that the light-emitting mechanism within the OLED 104 is activated.

The three-axis moving device 106 is disposed on another side of the platform 100 and the photo-detector 108 is disposed on the three-axis moving device 106 such that the photo-detector 108 toward the OLED 104 disposed on the goniometer 102. The photo-detector 108 is a brightness-measuring device, for example. The three-axis moving device 106 can be instructed to move forward or backward (in the X direction), up or down (in the Y direction) and left or right (in the Z direction) so that the photo-detector 108 on the three-axis moving device 106 is brought to any position demanded. Therefore, by setting of the five axial movements in the three-axis moving device 106 and the goniometer 102, relative position between the photo-detector 108 and the OLED 104 can be accurately controlled. Furthermore, the same data points can be obtained even if there is a change in the angular and/or positioning settings of the OLED 104. In other words, trustworthiness of the measured results is improved.

The computer is linked to the goniometer 102, the three-axis moving device 106 and the photo-detector 108 for controlling the rotation and/or tilt angle of the goniometer 102 as well as the location of the three-axis moving device 106. The computer also takes in the measured data of the photo-detector 108 and performs some data processing, graph plotting or statistical analysis on the data automatically.

Figure 2:
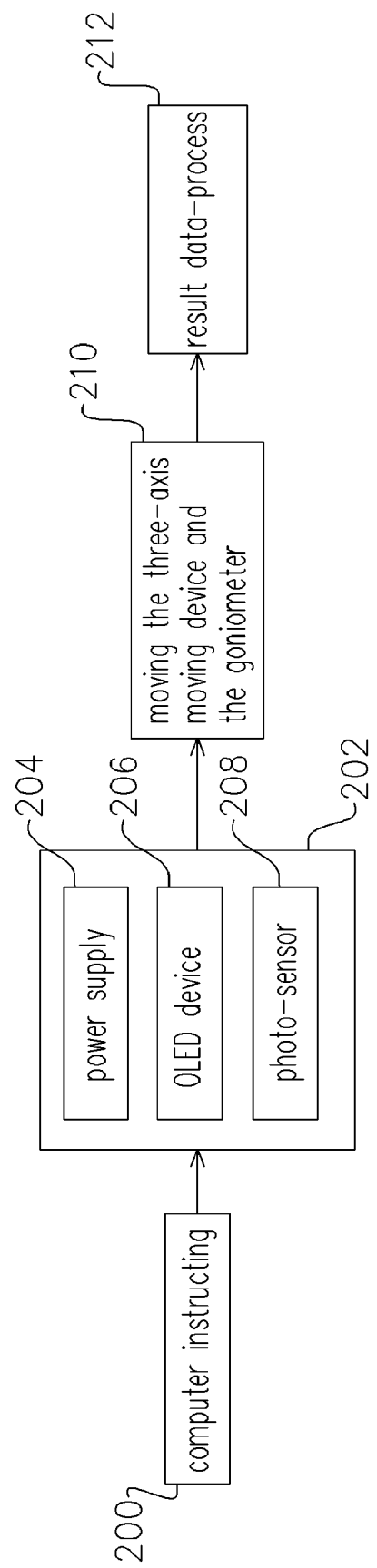
FIG. 2 is a flow chart showing the steps for measuring the optoelectric properties of an OLED according to one preferred embodiment of this invention.

FIG. 2 is a flow chart showing the steps for measuring the optoelectric properties of an OLED according to one preferred embodiment of this invention. As shown in FIG. 2, a computer instructs (step 200) a power supply 204 to provide necessary power for driving an OLED 206 and remotely controls the operation of the photo-sensor 208 (step 202). Thereafter, the computer instructs the three-axis moving device to move to a designated location and the goniometer to rotate and/or tilt to a specified angle (step 210). The photo-detector disposed on the three-axis moving device is activated to measure various optoelectric properties. All the results measured by the photo-detector are automatically sent to the computer and recorded, and then the results are data-processed, plotted or statistically analyzed (step 212).

In addition, this invention may also incorporate an integrated sphere (not shown) on the three-axis moving device 106 for providing a uniform brightness level in the surrounding space. Hence, the photo-detector 108 can be used to measure the contrast ratio of the OLED 104.

Furthermore, this invention may also incorporate a current driver (not shown) connected to the power supply 112. After instructing the power supply 112 to provide power to the OLED 104, the computer drives the OLED through the current driver so that an OLED response time measurement can be performed under predetermined conditions.

An example can be used to illustrate the method of measuring optoelectric properties of an OLED using the apparatus.

In the conventional method of measuring the optoelectric properties, the fixtures are set up and the photo-detector positioned manually. Since the disposing, alignment and calibration of 10 OLEDs take roughly 10 minutes and the same steps are repeated for each property measurement, measuring all the optoelectric properties of 10 OLEDs requires a total of about 200 minutes. Moreover, the operators performing the measurement must remain on site throughout the period.

In this invention, all the positioning and angle settings are carried out automatically through the computer. Hence, the disposing, alignment and calibration of 10 OLEDs require only 2 minutes. Furthermore, because the system carries out the measurement fully automatically, measuring all the optoelectric properties requires a total of about 150 minutes. The operator only has to dispose OLED just once and does not have to watch over the apparatus all of the time.

Accordingly, the apparatus and measuring method of this invention requires less manpower and time. Furthermore, with fully computerized control, the OLED is aligned and positioned accurately before any optoelectric property measurements. Hence, the measured results are very accurate and trustworthy. Moreover, unlike the conventional measuring method that requires an operator to move the OLED and the photo-detector from time to time, all the movements of the photo-detector and the OLED are controlled by the computer so that the operator only has to dispose the OLED once. Thus, industrial safety consideration of the operator is improved.

In summary, the advantages of this invention includes: 1. All angular and positional settings are effective through the computer so that the measured data is high in consistency and precision. 2. The OLED has to be disposed and aligned by the operator just once. After that, the operator is free to leave the apparatus. Hence, manpower demand is smaller and the measurement is faster. 3. This invention also permits the measurement of response time of the OLED.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An apparatus for measuring optoelectric properties of an organic light-emitting device (OLED), comprising:
    a platform;
        a goniometer disposed on one side of the platform, wherein an OLED is attached to the goniometer;
    a three-axis moving device disposed on another side of the platform;
    a photo-detector disposed on the three-axis moving device, wherein the photo-detector is oriented in a direction toward the OLED on the goniometer;
    a computer linked to the goniometer, the three-axis moving device and the photo-detector; and
    a power supply controlled by the computer for driving the OLED.

2. The apparatus of claim 1, wherein the goniometer is capable of rotating and tilting.

3. The apparatus of claim 1, wherein the three-axis moving device has mechanisms for moving forward and backward (in the X direction), up and down (in the Y direction) and left and right (in the Z direction).

4. The apparatus of claim 1, wherein the computer controls the movement of the three-axis moving device, the rotation and tilting of the goniometer and the recording of measured data obtained from the photo-detector.

5. The apparatus of claim 1, wherein the photo-detector further comprises a brightness-measuring device for measuring the brightness level, coloration, viewing angle and uniformity of the OLED.

6. The apparatus of claim 1, wherein the apparatus further comprises a current driver connected to the power supply and controlled by the computer for measuring the response time of the OLED under predetermined conditions.

7. A method of measuring the optoelectric properties of the OLED using the apparatus described in claim 1, comprising the steps of:
    programming the computer to drive the OLED via the power supply and to remotely control the photo-detector;
    programming the computer to drive the three-axis moving device to a specified location, and rotate and tilt the OLED on the goniometer to a specified angle;
    measuring the optoelectric properties of the OLED using the photo-detector; and
    recording the data measured by the photo-detector into the computer automatically.

8. The method of claim 7, wherein the computer further carries out a data processing, graph plotting and statistical analysis on the data measured by the photo-detector.

9. The method of claim 7, wherein the optoelectric properties of the OLED comprises the brightness, the coloration, the viewing angle, the uniformity, the contrast ratio and the response time of the OLED.

10. An apparatus for measuring optoelectric properties of an organic light-omitting device (OLED), comprising:
    a platform;
        a goniometer disposed on one side of the platform, wherein an OLED is attached to the goniometer;
    a three-axis moving device disposed on another side of the platform;
    a brightness detector disposed on the three-axis moving device, wherein the brightness detector is oriented in a direction toward die OLED on the goniometer;

a computer linked to the goniometer, the fine-axis moving device and the brightness detector; and a power supply controlled by the computer for driving the OLED.

11. The apparatus of claim 10, wherein the goniometer is capable of rotating and tilting.

12. The apparatus of claim 10, wherein the three-axis moving device has mechanisms for moving forward and backward (in the X direction), up and down (in the Y direction) and left and right (in the Z direction).

13. The apparatus of claim 10, wherein the computer controls the movement of the three-axis moving device, the rotation and tilting of the goniometer and the recording of measured data obtained from the brightness detector.

14. The apparatus of claim 10, wherein the apparatus further comprises a current driver connected to the power supply and controlled by the computer for measuring the response time of the OLED under predetermined conditions.

* * * * *